US011099716B2

(12) United States Patent
Jhawar et al.

(10) Patent No.: US 11,099,716 B2
(45) Date of Patent: Aug. 24, 2021

(54) CONTEXT BASED CONTENT NAVIGATION FOR WEARABLE DISPLAY

(71) Applicant: RealWear, Incorporated, Milpitas, CA (US)

(72) Inventors: Sanjay Subir Jhawar, Menlo Park, CA (US); Christopher Iain Parkinson, Richland, WA (US)

(73) Assignee: RealWear, Inc., Vancouver, WA (US)

( * ) Notice: Subject to any disclaimer, the term of this patent is extended or adjusted under 35 U.S.C. 154(b) by 92 days.

(21) Appl. No.: 15/390,389

(22) Filed: Dec. 23, 2016

(65) Prior Publication Data

US 2018/0181264 A1 Jun. 28, 2018

(51) Int. Cl.
*G06F 3/048* (2013.01)
*G06F 3/0482* (2013.01)
(Continued)

(52) U.S. Cl.
CPC ............ *G06F 3/0482* (2013.01); *G06F 1/163* (2013.01); *G06F 3/167* (2013.01); *G06F 21/31* (2013.01);
(Continued)

(58) Field of Classification Search
CPC ........ G06F 3/0482; G06F 1/163; G06F 3/167; G06F 17/212; G06F 17/218;
(Continued)

(56) References Cited

U.S. PATENT DOCUMENTS 4,944,361 A 7/1990 Lindgren et al.
5,046,192 A 9/1991 Ryder
(Continued)

FOREIGN PATENT DOCUMENTS

CN 101156104 A 4/2008
CN 201114708 Y 9/2008
(Continued)

OTHER PUBLICATIONS

Non-Final Office Action dated Jan. 9, 2018 in U.S. Appl. No. 15/390,363, 14 pages.
(Continued)

*Primary Examiner* — David S Posigian
*Assistant Examiner* — Jianmei F Duckworth
(74) *Attorney, Agent, or Firm* — Shook, Hardy & Bacon, L.L.P.

(57) ABSTRACT

Systems and methods provide for content navigation based on an identified context. A wearable device is initiated and loaded with content from a content repository. The loaded content comprises one or more digital tags. The wearable device is configured to provide for display, content associated with a digital tag. A context is determined for the wearable device, and based on the determined context a digital tag can be presented to a user for selection, the digital tag associate with a piece of content or a portion of content. A command can be received to select the digital tag or perform an action associated with the digital tag. A piece or portion of content associated with the selected digital tag is provided for display. A second digital tag can be presented along with the display of a piece or portion of content to enable further navigation through the content.

16 Claims, 6 Drawing Sheets

(51) Int. Cl.

| | | |
|---|---|---|
| *G06F 21/62* | (2013.01) | |
| *G06F 40/106* | (2020.01) | |
| *G06F 40/117* | (2020.01) | |
| *G06F 40/131* | (2020.01) | |
| *G06F 40/169* | (2020.01) | |
| *H04M 1/72454* | (2021.01) | |
| *H04M 1/72457* | (2021.01) | |
| *G06F 1/16* | (2006.01) | |
| *G06F 3/16* | (2006.01) | |
| *G06F 21/31* | (2013.01) | |
| *H04B 1/3827* | (2015.01) | |
| *G06F 3/01* | (2006.01) | |
| *G06F 3/0484* | (2013.01) | |
| *G06F 3/0346* | (2013.01) | |

(52) U.S. Cl.
CPC ........ *G06F 21/6218* (2013.01); *G06F 40/106* (2020.01); *G06F 40/117* (2020.01); *G06F 40/131* (2020.01); *G06F 40/169* (2020.01); *H04B 1/385* (2013.01); *H04M 1/72454* (2021.01); *H04M 1/72457* (2021.01); *G06F 3/012* (2013.01); *G06F 3/0346* (2013.01); *G06F 3/04842* (2013.01); *G06F 2203/04806* (2013.01); *H04B 2001/3866* (2013.01); *H04M 2201/40* (2013.01)

(58) Field of Classification Search
CPC .... G06F 17/2229; G06F 17/241; G06F 21/31; G06F 21/6218; G06F 40/106; G06F 40/117; G06F 40/131; G06F 40/169; G06F 3/012; G06F 3/04842; G06F 3/0346; G06F 2203/04806; H04B 1/385; H04B 2001/3866; H04M 1/72569; H04M 1/72572; H04M 2201/40; H04M 1/72454; H04M 1/72457
USPC ........................................................ 715/708
See application file for complete search history.

(56) References Cited

U.S. PATENT DOCUMENTS

| | | |
|---|---|---|
| 5,185,807 A | 2/1993 | Bergin et al. |
| 5,694,562 A | 12/1997 | Fisher |
| 5,767,820 A | 6/1998 | Bassett et al. |
| 5,796,374 A | 8/1998 | Cone et al. |
| 5,796,404 A | 8/1998 | Gentner |
| 5,806,079 A * | 9/1998 | Rivette ............ G06F 17/30014 707/E17.008 |
| 5,815,126 A | 9/1998 | Fan et al. |
| 5,850,211 A | 12/1998 | Tognazzini |
| 5,882,137 A | 3/1999 | Epp et al. |
| 5,977,935 A | 11/1999 | Yasukawa et al. |
| 6,061,064 A | 5/2000 | Reichlen |
| 6,114,978 A | 9/2000 | Hoag |
| 6,198,462 B1 | 3/2001 | Daily et al. |
| 6,204,974 B1 | 3/2001 | Spitzer |
| 6,222,583 B1 | 4/2001 | Matsumura et al. |
| 6,352,228 B1 | 3/2002 | Buerklin |
| 6,388,657 B1 | 5/2002 | Natoli |
| 6,434,250 B1 | 8/2002 | Tsuhako |
| 6,456,262 B1 | 9/2002 | Bell |
| 6,489,976 B1 | 12/2002 | Patil et al. |
| 6,496,842 B1 | 12/2002 | Lyness |
| 6,587,700 B1 | 7/2003 | Meins et al. |
| 6,600,480 B2 | 7/2003 | Natoli |
| 6,637,883 B1 | 10/2003 | Tengshe et al. |
| 6,708,339 B1 | 3/2004 | Smith, Jr. |
| 6,747,611 B1 | 6/2004 | Budd et al. |
| 6,867,752 B1 | 3/2005 | Yamazaki et al. |
| 6,911,969 B1 | 6/2005 | Nelson et al. |
| 7,103,841 B2 | 9/2006 | Ronkainen et al. |
| 7,113,170 B2 | 9/2006 | Lauper et al. |
| 7,124,425 B1 | 10/2006 | Anderson, Jr. et al. |
| 7,134,094 B2 | 11/2006 | Stabb et al. |
| 7,243,309 B2 | 7/2007 | Koay et al. |
| 7,245,737 B2 | 7/2007 | Inmae et al. |
| 7,290,220 B2 | 10/2007 | Bhogal et al. |
| 7,315,988 B2 | 1/2008 | Cragun et al. |
| 7,353,464 B1 | 4/2008 | Kundu et al. |
| 7,453,451 B1 | 11/2008 | Maguire, Jr. |
| 7,613,292 B2 | 11/2009 | te Riet |
| 7,661,074 B2 | 2/2010 | Sadler et al. |
| 7,849,397 B1 | 12/2010 | Ahmed |
| 7,853,050 B2 | 12/2010 | Wang et al. |
| 7,928,926 B2 | 4/2011 | Yamamoto et al. |
| 7,933,900 B2 | 4/2011 | Reddy et al. |
| 7,962,344 B2 | 6/2011 | Sharpe et al. |
| 8,051,105 B1 | 11/2011 | Johnson |
| 8,065,620 B2 | 11/2011 | Chen et al. |
| 8,378,924 B2 | 2/2013 | Jacobsen et al. |
| 8,432,400 B1 | 4/2013 | Weskamp |
| 8,531,355 B2 | 9/2013 | Maltz |
| 8,549,443 B2 | 10/2013 | Irvine |
| 8,643,951 B1 | 2/2014 | Wheeler et al. |
| 8,645,831 B2 | 2/2014 | Wang |
| 8,667,421 B2 | 3/2014 | Grunberger |
| 8,706,685 B1 | 4/2014 | Smith et al. |
| 8,743,021 B1 | 6/2014 | Park et al. |
| 8,751,969 B2 | 6/2014 | Matsuda et al. |
| 8,788,271 B2 | 7/2014 | James et al. |
| 8,855,719 B2 | 10/2014 | Jacobsen et al. |
| 8,922,481 B1 | 12/2014 | Kauffmann et al. |
| 8,929,589 B2 | 1/2015 | Publicover et al. |
| 8,990,682 B1 | 3/2015 | Wong et al. |
| 9,075,249 B2 | 7/2015 | Heinrich et al. |
| 9,122,307 B2 | 9/2015 | Jacobsen et al. |
| 9,134,793 B2 | 9/2015 | McDonald et al. |
| 9,135,914 B1 | 9/2015 | Bringert et al. |
| 9,158,115 B1 | 10/2015 | Worley et al. |
| 9,164,588 B1 | 10/2015 | Johnson et al. |
| 9,240,069 B1 | 1/2016 | Li |
| 9,268,580 B2 | 2/2016 | Hampton et al. |
| 9,285,872 B1 | 3/2016 | Raffle et al. |
| 9,294,607 B2 | 3/2016 | Jacobsen et al. |
| 9,298,970 B2 | 3/2016 | Wang et al. |
| 9,301,085 B2 | 3/2016 | Parkinson et al. |
| 9,377,852 B1 | 6/2016 | Shapiro et al. |
| 9,377,862 B2 | 6/2016 | Parkinson et al. |
| 9,442,631 B1 | 9/2016 | Patel et al. |
| 9,477,888 B1 | 10/2016 | Lewis |
| 9,500,867 B2 | 11/2016 | Hennelly et al. |
| 9,588,593 B2 | 3/2017 | Li |
| 9,615,067 B1 | 4/2017 | Foote et al. |
| 9,658,451 B2 | 5/2017 | Kobayashi |
| 9,678,637 B1 * | 6/2017 | Brothers ........ H04N 21/234336 |
| 9,690,763 B1 | 6/2017 | Lee |
| 9,817,232 B2 | 11/2017 | Lindley et al. |
| 9,823,742 B2 | 11/2017 | Parker et al. |
| 9,904,369 B2 | 2/2018 | Lai et al. |
| 9,913,302 B2 | 3/2018 | Parkinson et al. |
| 9,916,006 B2 | 3/2018 | Maltz |
| 9,922,254 B1 | 3/2018 | Ho et al. |
| 9,940,754 B2 | 4/2018 | Kuribara |
| 9,946,079 B2 | 4/2018 | Ozeki |
| 10,013,053 B2 | 7/2018 | Cederlund et al. |
| 10,013,976 B2 | 7/2018 | Woodall et al. |
| 10,048,750 B2 | 8/2018 | Du et al. |
| 10,078,416 B2 | 9/2018 | Tsuda |
| 10,255,101 B2 | 4/2019 | Zielinski et al. |
| 10,255,249 B1 * | 4/2019 | Yu ........................ G06F 40/106 |
| 10,275,023 B2 | 4/2019 | McKenzie et al. |
| 10,288,908 B2 | 5/2019 | Calilung et al. |
| 10,359,982 B2 | 7/2019 | Fuchikami et al. |
| 10,540,064 B1 | 1/2020 | Chasin |
| 10,740,976 B2 | 8/2020 | Short et al. |
| 2001/0040590 A1 | 11/2001 | Abbott et al. |
| 2002/0015008 A1 | 2/2002 | Kishida et al. |
| 2002/0037770 A1 | 3/2002 | Paul et al. |
| 2002/0044152 A1 | 4/2002 | Abbott, III et al. |
| 2002/0190947 A1 | 12/2002 | Feinstein |

(56) References Cited

U.S. PATENT DOCUMENTS

| | | |
|---|---|---|
| 2003/0020707 A1 | 1/2003 | Kangas et al. |
| 2003/0156130 A1 | 8/2003 | James et al. |
| 2003/0158736 A1 | 8/2003 | James et al. |
| 2003/0174170 A1 | 9/2003 | Jung et al. |
| 2003/0182713 A1 | 10/2003 | Rolla |
| 2003/0184585 A1 | 10/2003 | Lin et al. |
| 2004/0008158 A1 | 1/2004 | Chi et al. |
| 2004/0102971 A1 | 5/2004 | Lipscher et al. |
| 2004/0104944 A1 | 6/2004 | Koay et al. |
| 2004/0218776 A1 | 11/2004 | Rolla |
| 2004/0252119 A1 | 12/2004 | Hunleth et al. |
| 2005/0015730 A1 | 1/2005 | Gunturi et al. |
| 2005/0071171 A1 | 3/2005 | Dvorak |
| 2005/0071172 A1 | 3/2005 | James |
| 2005/0083248 A1 | 4/2005 | Biocca et al. |
| 2005/0146488 A1 | 7/2005 | Travers et al. |
| 2006/0044265 A1 | 3/2006 | Min |
| 2006/0048286 A1 | 3/2006 | Donato |
| 2006/0074980 A1 | 4/2006 | Sarkar |
| 2006/0085765 A1 | 4/2006 | Peterson et al. |
| 2006/0256090 A1 | 11/2006 | Huppi |
| 2007/0024507 A1 | 2/2007 | Kasamatsu et al. |
| 2007/0052672 A1 | 3/2007 | Ritter et al. |
| 2007/0130547 A1 | 6/2007 | Boillot |
| 2007/0171193 A1 | 7/2007 | Nakamura |
| 2007/0183616 A1 | 8/2007 | Wahl et al. |
| 2007/0211023 A1 | 9/2007 | Boillot |
| 2007/0220108 A1 | 9/2007 | Whitaker |
| 2007/0220439 A1 | 9/2007 | Fukura et al. |
| 2008/0276178 A1 | 11/2008 | Fadell et al. |
| 2009/0099836 A1 | 4/2009 | Jacobsen et al. |
| 2009/0100732 A1 | 4/2009 | Seidler |
| 2009/0128448 A1 | 5/2009 | Riechel |
| 2009/0154990 A1 | 6/2009 | Julliere |
| 2009/0182562 A1 | 7/2009 | Caire et al. |
| 2009/0195652 A1 | 8/2009 | Gal |
| 2009/0300506 A1* | 12/2009 | Drucker ............... G06F 16/9577 715/738 |
| 2010/0036665 A1 | 2/2010 | Bess et al. |
| 2010/0086278 A1 | 4/2010 | Stankiewicz et al. |
| 2010/0138759 A1 | 6/2010 | Roy |
| 2010/0194350 A1 | 8/2010 | Chatterjee et al. |
| 2010/0259471 A1 | 10/2010 | Takano et al. |
| 2010/0315329 A1 | 12/2010 | Previc et al. |
| 2010/0328204 A1 | 12/2010 | Edwards et al. |
| 2011/0001699 A1 | 1/2011 | Jacobsen et al. |
| 2011/0090135 A1 | 4/2011 | Tricoukes et al. |
| 2011/0096036 A1 | 4/2011 | McIntosh et al. |
| 2011/0187640 A1 | 8/2011 | Jacobsen et al. |
| 2011/0199389 A1 | 8/2011 | Lu et al. |
| 2011/0249122 A1 | 10/2011 | Tricoukes et al. |
| 2012/0002046 A1 | 1/2012 | Rapport et al. |
| 2012/0019662 A1 | 1/2012 | Maltz |
| 2012/0050143 A1 | 3/2012 | Border et al. |
| 2012/0062444 A1 | 3/2012 | Cok et al. |
| 2012/0068914 A1 | 3/2012 | Jacobsen et al. |
| 2012/0086624 A1 | 4/2012 | Thompson et al. |
| 2012/0096341 A1 | 4/2012 | Suga |
| 2012/0114131 A1 | 5/2012 | Tricoukes et al. |
| 2012/0151349 A1 | 6/2012 | Hahm et al. |
| 2012/0192065 A1 | 7/2012 | Migos et al. |
| 2012/0215543 A1 | 8/2012 | Oz et al. |
| 2012/0235896 A1 | 9/2012 | Jacobsen et al. |
| 2012/0235902 A1 | 9/2012 | Eisenhardt et al. |
| 2012/0236025 A1 | 9/2012 | Jacobsen et al. |
| 2012/0272179 A1 | 10/2012 | Stafford |
| 2012/0272484 A1 | 11/2012 | Willborn |
| 2012/0287284 A1 | 11/2012 | Jacobsen et al. |
| 2013/0007672 A1 | 1/2013 | Taubman |
| 2013/0007686 A1 | 1/2013 | Lu |
| 2013/0021269 A1 | 1/2013 | Johnson et al. |
| 2013/0047322 A1 | 2/2013 | Peebles |
| 2013/0054576 A1 | 2/2013 | Karmarkar et al. |
| 2013/0069985 A1 | 3/2013 | Wong et al. |
| 2013/0089214 A1 | 4/2013 | Tricoukes et al. |
| 2013/0090062 A1 | 4/2013 | Tricoukes et al. |
| 2013/0117105 A1 | 5/2013 | Dyor et al. |
| 2013/0117111 A1 | 5/2013 | Dyor et al. |
| 2013/0135353 A1 | 5/2013 | Wheeler et al. |
| 2013/0169514 A1 | 7/2013 | Edwards et al. |
| 2013/0174205 A1 | 7/2013 | Jacobsen et al. |
| 2013/0187835 A1 | 7/2013 | Vaught et al. |
| 2013/0230253 A1 | 9/2013 | Stankiewicz et al. |
| 2013/0231937 A1 | 9/2013 | Woodall et al. |
| 2013/0239000 A1 | 9/2013 | Parkinson et al. |
| 2013/0241805 A1 | 9/2013 | Gomez |
| 2013/0246920 A1 | 9/2013 | Fields et al. |
| 2013/0246967 A1 | 9/2013 | Wheeler et al. |
| 2013/0278631 A1 | 10/2013 | Border et al. |
| 2013/0285886 A1 | 10/2013 | Pombo et al. |
| 2013/0288753 A1 | 10/2013 | Jacobsen et al. |
| 2013/0307797 A1 | 11/2013 | Taguchi et al. |
| 2013/0321255 A1 | 12/2013 | Lamb et al. |
| 2013/0326208 A1 | 12/2013 | Jacobsen et al. |
| 2014/0000015 A1 | 1/2014 | Arai |
| 2014/0002341 A1 | 1/2014 | Nister et al. |
| 2014/0002357 A1 | 1/2014 | Pombo et al. |
| 2014/0028923 A1 | 1/2014 | Griffin et al. |
| 2014/0035819 A1 | 2/2014 | Griffin |
| 2014/0043214 A1 | 2/2014 | Park et al. |
| 2014/0058733 A1 | 2/2014 | Voorhees et al. |
| 2014/0092018 A1 | 4/2014 | Geithner |
| 2014/0098132 A1* | 4/2014 | Fein ............... G06T 19/006 345/633 |
| 2014/0111427 A1 | 4/2014 | Lindley et al. |
| 2014/0111838 A1 | 4/2014 | Han et al. |
| 2014/0125590 A1 | 5/2014 | Flagg et al. |
| 2014/0153173 A1 | 6/2014 | Pombo et al. |
| 2014/0168130 A1 | 6/2014 | Hirai |
| 2014/0191964 A1 | 7/2014 | McDonald et al. |
| 2014/0195247 A1 | 7/2014 | Parkinson et al. |
| 2014/0218269 A1 | 8/2014 | Cazalet et al. |
| 2014/0237366 A1 | 8/2014 | Poulos et al. |
| 2014/0240245 A1 | 8/2014 | Kim |
| 2014/0253605 A1 | 9/2014 | Border et al. |
| 2014/0267419 A1 | 9/2014 | Ballard et al. |
| 2014/0268054 A1 | 9/2014 | Olsson et al. |
| 2014/0282118 A1 | 9/2014 | Kumamoto |
| 2014/0282144 A1 | 9/2014 | Maciocci |
| 2014/0282278 A1 | 9/2014 | Anderson et al. |
| 2014/0289641 A1 | 9/2014 | Whitcroft |
| 2014/0294302 A1* | 10/2014 | King ............... G06F 16/5846 382/177 |
| 2014/0361988 A1 | 12/2014 | Katz et al. |
| 2014/0368412 A1 | 12/2014 | Jacobsen et al. |
| 2014/0375544 A1 | 12/2014 | Venable et al. |
| 2014/0380230 A1 | 12/2014 | Venable et al. |
| 2015/0007114 A1 | 1/2015 | Poulos et al. |
| 2015/0009132 A1 | 1/2015 | Kuriya et al. |
| 2015/0067516 A1 | 3/2015 | Park et al. |
| 2015/0102984 A1 | 4/2015 | Wong et al. |
| 2015/0128124 A1 | 5/2015 | Grey et al. |
| 2015/0130740 A1 | 5/2015 | Cederlund et al. |
| 2015/0138089 A1 | 5/2015 | Angerbauer et al. |
| 2015/0142440 A1 | 5/2015 | Parkinson et al. |
| 2015/0149168 A1 | 5/2015 | Stent et al. |
| 2015/0153571 A1 | 6/2015 | Ballard et al. |
| 2015/0186109 A1 | 7/2015 | Jarvinen et al. |
| 2015/0199106 A1 | 7/2015 | Johnson |
| 2015/0206321 A1* | 7/2015 | Scavezze ............... G06T 7/20 345/633 |
| 2015/0213778 A1 | 7/2015 | Moravetz |
| 2015/0220142 A1 | 8/2015 | Parkinson et al. |
| 2015/0243288 A1 | 8/2015 | Katsuranis |
| 2015/0288666 A1 | 10/2015 | Rao et al. |
| 2015/0293597 A1 | 10/2015 | Mishra et al. |
| 2015/0309316 A1 | 10/2015 | Osterhout et al. |
| 2015/0324645 A1 | 11/2015 | Jang et al. |
| 2015/0338914 A1 | 11/2015 | Andrysco |
| 2015/0378160 A1 | 12/2015 | Lee et al. |
| 2016/0004306 A1 | 1/2016 | Maltz |
| 2016/0026253 A1 | 1/2016 | Bradski et al. |
| 2016/0034039 A1 | 2/2016 | Maeda et al. |
| 2016/0041619 A1 | 2/2016 | Ishiwata et al. |

(56) References Cited

U.S. PATENT DOCUMENTS

| | | |
|---|---|---|
| 2016/0054807 A1 | 2/2016 | Flagg et al. |
| 2016/0062458 A1 | 3/2016 | Kristensson et al. |
| 2016/0077337 A1 | 3/2016 | Raffle et al. |
| 2016/0085077 A1 | 3/2016 | Milea et al. |
| 2016/0092048 A1 | 3/2016 | van den Broek et al. |
| 2016/0093105 A1 | 3/2016 | Rimon et al. |
| 2016/0124501 A1 | 5/2016 | Lam et al. |
| 2016/0147302 A1 | 5/2016 | Choi |
| 2016/0162020 A1 | 6/2016 | Lehman et al. |
| 2016/0178912 A1 | 6/2016 | Kusuda et al. |
| 2016/0179855 A1* | 6/2016 | Roman .................... H04L 63/08 707/744 |
| 2016/0188283 A1 | 6/2016 | Sendai et al. |
| 2016/0191172 A1 | 6/2016 | Masarik |
| 2016/0234190 A1 | 8/2016 | Hird |
| 2016/0259862 A1* | 9/2016 | Navanageri ........... G06F 16/955 |
| 2016/0283724 A1 | 9/2016 | Hird |
| 2016/0292922 A1 | 10/2016 | Kasahara |
| 2016/0324248 A1 | 11/2016 | Winters et al. |
| 2016/0329634 A1 | 11/2016 | Osterhout et al. |
| 2016/0342782 A1 | 11/2016 | Mullins et al. |
| 2016/0370855 A1 | 12/2016 | Lanier et al. |
| 2016/0370970 A1 | 12/2016 | Chu et al. |
| 2017/0017464 A1 | 1/2017 | Roy |
| 2017/0060230 A1 | 3/2017 | Faaborg et al. |
| 2017/0076504 A1 | 3/2017 | Oar et al. |
| 2017/0092002 A1 | 3/2017 | Mullins et al. |
| 2017/0103680 A1 | 4/2017 | Campbell et al. |
| 2017/0115728 A1 | 4/2017 | Park et al. |
| 2017/0160812 A1 | 6/2017 | Park et al. |
| 2017/0161240 A1 | 6/2017 | Lee et al. |
| 2017/0168305 A1 | 6/2017 | Kusuda et al. |
| 2017/0337177 A1 | 11/2017 | Maxwell, III et al. |
| 2017/0337897 A1 | 11/2017 | Jung et al. |
| 2017/0344609 A1* | 11/2017 | Wadley ................. G06F 16/248 |
| 2017/0351393 A1 | 12/2017 | Ott et al. |
| 2017/0351778 A1* | 12/2017 | Sperling ............... G06F 17/241 |
| 2018/0011326 A1 | 1/2018 | Ishizaki |
| 2018/0018073 A1 | 1/2018 | Lemay et al. |
| 2018/0033204 A1 | 2/2018 | Dimitrov et al. |
| 2018/0088746 A1 | 3/2018 | Cheung et al. |
| 2018/0121265 A1 | 5/2018 | Rosnow et al. |
| 2018/0129276 A1 | 5/2018 | Nguyen et al. |
| 2018/0131907 A1* | 5/2018 | Schmirler ............. G06T 19/006 |
| 2018/0143756 A1 | 5/2018 | Mildrew et al. |
| 2018/0150204 A1 | 5/2018 | MacGillivray |
| 2018/0247402 A1 | 8/2018 | Xie et al. |
| 2018/0276896 A1* | 9/2018 | Launonen ............. G06F 17/241 |
| 2018/0321493 A1 | 11/2018 | Kim et al. |
| 2018/0341627 A1 | 11/2018 | Moldovean et al. |
| 2018/0356884 A1 | 12/2018 | Lee |
| 2018/0373325 A1 | 12/2018 | Rosso et al. |
| 2019/0050112 A1 | 2/2019 | Kandadai et al. |
| 2019/0362557 A1 | 11/2019 | Lacey et al. |

FOREIGN PATENT DOCUMENTS

| | | |
|---|---|---|
| CN | 101518097 A | 8/2009 |
| CN | 201674632 U | 12/2010 |
| CN | 104407478 A | 3/2015 |
| CN | 104969115 A | 10/2015 |
| CN | 105228089 A | 1/2016 |
| CN | 105229720 A | 1/2016 |
| CN | 105848040 A | 8/2016 |
| CN | 106066537 A | 11/2016 |
| CN | 205691887 U | 11/2016 |
| JP | 2004-247897 A | 9/2004 |
| JP | 2006-319440 A | 11/2006 |
| JP | 2009-33308 A | 2/2009 |
| JP | 2016-12838 A | 1/2016 |
| JP | 2016-54351 A | 4/2016 |
| WO | 00/55673 A1 | 9/2000 |

OTHER PUBLICATIONS

International Search Report dated Feb. 16, 2018 in International Patent Application No. PCT/US2017/066656, 15 pages.

International Search Report and Written Opinion dated Jan. 19, 2018 in International Patent Application No. PCT/US2017/064898, 12 pages.

International Search Report and Written Opinion dated Feb. 23, 2018 in International Patent Application No. PCT/US2017/064905, 9 pages.

International Search Report and Written Opinion dated Mar. 5, 2018 in International Patent Application No. PCT/US2017/068123, 9 pages.

Final Office Action dated Aug. 2, 2018 in U.S. Appl. No. 15/390,363, 16 pages.

Non-Final Office Action dated Aug. 9, 2018 in U.S. Appl. No. 15/390,375, 8 pages.

Non-Final Office Action dated Sep. 26, 2018 in U.S. Appl. No. 15/390,380, 14 pages.

International Search Report and Written Opinion dated Apr. 13, 2018 in International Patent Application No. PCT/US2017/064904, 13 pages.

International Search Report and Written Opinion dated Apr. 20, 2018 in International Patent Application No. PCT/US2017/064904, 12 pages.

The RealWear HMI-1 can be used with both hard hat and safety glasses #safetyfirst #msasafety #iiot #wearables @realheadwear inc (Realwear Inc) Sep. 15, 2016 (Sep. 15, 2016), available at: <www.facebook.com/RealWearInc/>, entire document.

"Andy Lowery on the Industrial Internet" (Techonomy Media) Nov. 30, 2016 (Nov. 30, 2016), available at: <https://www.youtube.com/watch?v=OC1QM5aV5o4&feature=youtu.be>, entire document,especially at (2:10).

First Action Interview Pre-Interview Communication dated Nov. 16, 2018 in U.S. Appl. No. 15/697,214, 7 pages.

Non-Final Office Action dated Dec. 5, 2018 in U.S. Appl. No. 15/390,363, 9 pages.

Final Office Action dated Feb. 1, 2019 in U.S. Appl. No. 15/390,375, 8 pages.

First Action Interview Office Action dated Feb. 7, 2019 in U.S. Appl. No. 15/697,214, 29 pages.

First Action Interview Pre-Interview Communication dated Feb. 19, 2019 in U.S. Appl. No. 15/390,191, 11 pages.

Notice of Allowance dated Mar. 21, 2019 in U.S. Appl. No. 15/390,380, 7 pages.

First Action Interview Office Action dated Apr. 12, 2019 in U.S. Appl. No. 15/390,191, 7 pages.

Notice of Allowance dated Apr. 24, 2019 in U.S. Appl. No. 15/390,375, 7 pages.

Notice of Allowance dated May 21, 2019 in U.S. Appl. No. 15/390,363, 7 pages.

International Preliminary Report on Patentability dated Jul. 4, 2019 in International Patent Application No. PCT/US2017/064898, 10 pages.

International Preliminary Report on Patentability dated Jul. 4, 2019 in International Patent Application No. PCT/US2017/064902, 7 pages.

International Preliminary Report on Patentability dated Jul. 4, 2019 in International Patent Application No. PCT/US2017/064904, 13 pages.

International Preliminary Report on Patentability dated Jul. 4, 2019 in International Patent Application No. PCT/US2017/064905, 7 pages.

International Preliminary Report on Patentability dated Jul. 4, 2019 in International Patent Application No. PCT/US2017/066656, 14 pages.

International Preliminary Report on Patentability dated Jul. 4, 2019 in International Patent Application No. PCT/US2017/068123, 8 pages.

Final Office Action dated Oct. 15, 2019 in U.S. Appl. No. 15/697,214, 27 pages.

Notice of Allowance dated Nov. 29, 2019 in U.S. Appl. No. 15/390,191, 9 pages.

(56) References Cited

OTHER PUBLICATIONS

International Search Report and Written Opinion dated Aug. 27, 2019 in International Patent Application No. PCT/US19/36124, 17 pages.
Partial Supplementary Search Report received for European Patent Application No. 17882453.8, dated May 4, 2020, 17 pages.
Extended European Search Report and Opinion received for European Patent Application No. 17884064.1, dated May 12, 2020, 10 pages.
Extended European Search Report received for European Patent Application No. 17882728.3, dated Jul. 2, 2020, 12 pages.
Extended European Search Report received for European Patent Application No. 17884876.8, dated Jul. 7, 2020, 9 pages.
Extended European Search Report and Opinion received for European Patent Application No. 17884446.0, dated Aug. 3, 2020, 9 pages.
Non-Final Office Action dated May 27, 2020 in U.S. Appl. No. 15/697,214, 26 pages.
Non-Final Office Action dated Jun. 1, 2020 in U.S. Appl. No. 16/007,773, 16 pages.
Extended European Search Report and Opinion received for European Patent Application No. 17885286.9, dated Sep. 17, 2020, 8 pages.
Extended European Search Report and Opinion received for European Patent Application No. 17882453.8, dated Oct. 19, 2020, 19 pages.
Notice of Allowance dated Oct. 22, 2020 in U.S. Appl. No. 15/697,214, 20 pages.
Non-Final Office Action dated Nov. 6, 2020 in U.S. Appl. No. 16/584,285, 14 pages.
First Office Action and Search received for Chinese Patent Application No. 201780086004.8, dated Jan. 25, 2021, 27 pages. (English Translation Submitted).
Final Office Action dated Dec. 10, 2020 in U.S. Appl. No. 16/007,773, 15 pages.
Preinterview First Office Action dated Feb. 2, 2021 in U.S. Appl. No. 16/828,541, 5 pages.
First Office Action and Search received for Chinese Patent Application No. 201780080132.1, dated Nov. 26, 2020, 22 pages.
International Preliminary Report on Patentability received for PCT Application No. PCT/US2019/036124, dated Dec. 24, 2020, 11 pages.
First Office Action and Search received for Chinese Patent Application No. 201780085636.2, dated Jan. 6, 2021, 19 pages.
First Office Action and Search received for Chinese Patent Application No. 201780085733.1, dated Jan. 11, 2021, 28 pages.
Examination Report received for Indian Patent Application No. 201917026919, dated May 4, 2021, 6 pages.
Examination Report received for Indian Patent Application No. 201917027715, dated May 30, 2021, 8 pages.
Examination Report received for Indian Patent Application No. 201917027530, dated Jun. 7, 2021, 6 pages.
Final Office Action dated Apr. 14, 2021 in U.S. Appl. No. 16/584,285, 13 pages.
Non-Final Office Action dated May 12, 2021 in U.S. Appl. No. 16/007,773, 21 pages.
First Action Interview Office Action dated May 24, 2021 in U.S. Appl. No. 16/828,541, 5 pages.

\* cited by examiner

CONTEXT BASED CONTENT NAVIGATION FOR WEARABLE DISPLAY

CROSS-REFERENCE TO RELATED APPLICATIONS

This application relates to and has the same priority date as the following applications: U.S. patent Ser. No. 10/437,070, entitled INTERCHANGEABLE OPTICS FOR A HEAD-MOUTNED DISPLAY; U.S. patent Ser. No. 10/365,493, entitled MODULAR COMPONENTS FOR A HEAD-MOUNTED DISPLAY; U.S. patent Ser. No. 10/620,910, entitled HANDS-FREE NAVIGATION OF TOUCH-BASED OPERATING SYSTEMS; and U.S. patent Ser. No. 10/393,312, entitled ARTICULATING COMPONENTS FOR A HEAD-MOUNTED DISPLAY; each of which is hereby incorporated in its entirety by reference herein.

BACKGROUND

In industrial settings a user may need to provide maintenance or perform other duties associated with complex equipment and be required to consult a large amount of technical documentation, which is generally provided to a user via binders, tablets, or laptops. There are, however, inherent inefficiencies associated with methodologies involving having to navigate and find the desired information this way. Finding required content through manual navigation or through touch-based systems can be an ineffective use of time and require a user to stop and restart tasks in order to do so.

SUMMARY OF THE INVENTION

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

At a high level, embodiments of the present invention are generally directed to facilitating the access and the use of electronic content on a wearable device through hands-free operation. In a situation where a user needs to easily access multiple documents or even further, multiple specific portions of multiple documents based on the context of a given situation, the methods and systems described herein provide a user to easily and efficiently navigate to specific views of content or portions of content. In various embodiments, collections of digital tags associated with content are utilized to navigate through the content. For example, based on a variety of contexts, sets of content may be prepared such that a user can easily pair down required data and navigate through only relevant documents for a given task. Thus herein is provided a contextually aware command driven navigation system for a user to navigate to various portions of documents; context is associated to a place where a user may access specific content, and based on that context specific documents or portions of documents can be retried and presented to a user. In various embodiments, a content navigation system is provided. The content navigation system generally comprising a wearable computing device with a display, a content repository comprising content, location sensors and/or transmitters and external computing devices which can be operably connected through a network. The content may include at least one associated digital tag, the digital tag associated further with a context. In various embodiments, the wearable device may be initialized and loaded, i.e. stored locally, with some content, the content including the digital tags. A digital tag may be conceptually comparable to a digital bookmark, allowing a computing device to, in a single step, advance to the marked portion of the content. The marked portion of content may be defined by any number of factors that drive viewing with a computing device, such as a particular piece of content, a page number, a zoom level, or coordinates on a page to name a few. Subsequently, a context for the wearable device is determined based on location, orientation, or other factors, and stored at the wearable device to aid in driving content navigation. Once a context for the wearable device is determined, digital tags may be presented to a user via a display that are selectable by a command, for example, a voice command. The digital tags associated with the content are presented to a user based on the determined context. As such, the context allows only certain digital tags to be presented to a user and thus allowing the user to navigate through the content based on presented digital tags. In this way the selection of one digital tag drives the presentation of another piece of content or portion of content and other associated digital tags. Further as user may add their own digital tags and annotations to content or portions of content. After use, the locally stored documents with potentially newly added information are synchronized back to a network server or content repository on the network. Subsequent users may then be able to utilize a previous user's digital tags, or in alternate embodiments, digital tags may be suggested to a subsequent user based on their prior usage in the determined context.

Additional objects, advantages, and novel features of the invention will be set forth in part in the description which follows, and in part will become apparent to those skilled in the art upon examination of the following, or may be learned by practice of the invention.

BRIEF DESCRIPTION OF THE DRAWINGS

The features of the invention noted above are explained in more detail with reference to the embodiments illustrated in the attached drawing figures, in which like reference numerals denote like elements, in which FIGS. 1-6 illustrate an embodiment of the present invention and in which:

FIG. 1 provides a schematic diagram showing an exemplary operating environment for a content navigation system in accordance with some implementations of the present disclosure;

FIG. 2 provides a schematic diagram showing an exemplary content navigation system, in accordance with some implementations of the present disclosure;

FIGS. 3A-3C provide a screen display showing a series of example user interface presentations for content navigation, in accordance with some implementations of the present disclosure;

FIG. 4 provides an illustrative process flow depicting a method for content navigation, in accordance with some implementations of the present disclosure;

FIG. 5 provides an illustrative process flow depicting a method for content navigation and tagging, in accordance with some implementations of the present disclosure;

FIG. 6 provides a block diagram of an exemplary computing device in which some implementations of the present disclosure may be employed.

DETAILED DESCRIPTION

The ability to easily and efficiently access and navigate relevant content through the use of a wearable device is an important aspect for user workflow and operation in particular scenarios, for example, in industrial applications where a user needs to navigate a potentially large volume of content quickly and while maintaining interaction with the technology while concurrently engaged in other tasks.

Utilizing a wearable device in accordance with embodiments of the present disclosure, such as, for example, a head-mounted computing device including a display, a user may view and navigate a large amount of documentation or other content using the display as a viewer. In accordance with some embodiments of the present disclosure, the display acts as a window onto a larger virtual space, allowing a user to navigate to a specified page within a specific document, zoom into and out of a page achieving various levels of magnification, and utilize hands-free movements to pan longitudinally or vertically over a page to arrive at desired XY coordinate of a stationary document within the larger virtual space.

In accordance with some embodiments of the present disclosure, the navigation described above may be enhanced through the use of digital tags used in conjunction with voice commands. For example, through a voice command (i.e. natural language interaction), a user may navigate directly to a specific document (or file), page within the document, XY coordinate on the page, and a zoom level, where any combination of variables may be embedded as metadata within an associated digital tag. In this way, a user may navigate content and specific views of that content through the efficient use of digital tagging in conjunction with voice accessibility.

In some embodiments of the present disclosure, location and orientation information may be utilized to further drive content navigation. For example, the digital tags as previously described may be associated with a specific place and/or orientation to provide context for a user. Using determined contextual information, a wearable device may automatically present a set or subset of digital tags for a user to navigate content with. In this way, a digital tag can be associated to the content as well as a location and direction.

As such, embodiments of the present invention are directed towards accessing and navigating content based on contextual determinations using a wearable device, for example a head-mounted computing device. In this way, aspects of the present disclosure relate to devices, methods, and systems that facilitate hands-free interaction with various content and user interfaces.

Figure 1:
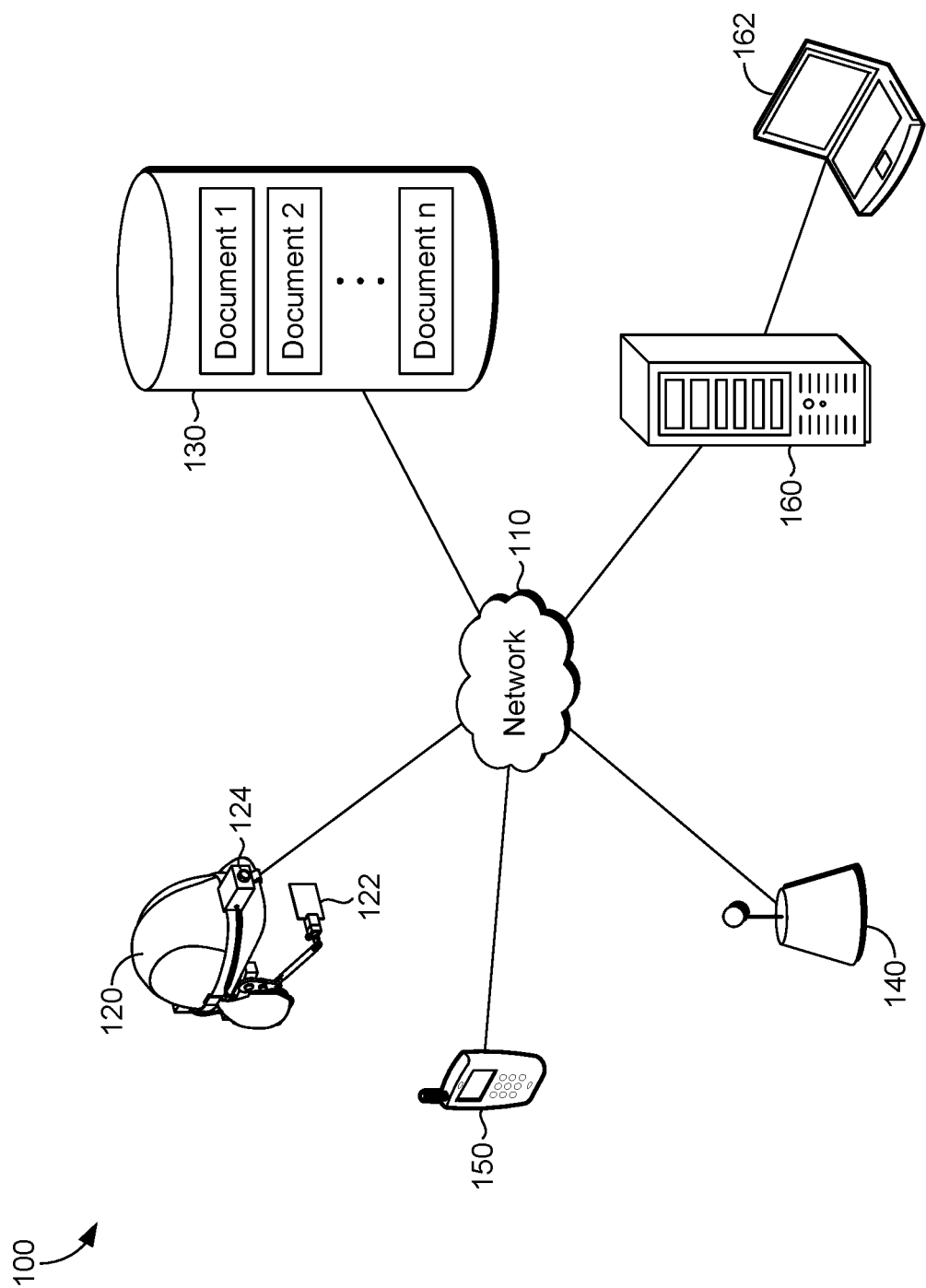

FIG. 1 depicts aspects of an operating environment 100 for a content navigation system in accordance with various embodiments of the present disclosure. Operating environment 100 may include, among other components, a wearable device 120, a content repository 130, a location sensor or access point 140, a user device 150, and one or more servers 160. The components can be configured to be in operable communication with one another via a network 110. The wearable device 120 includes any computing device, more particularly any head-mounted computing device (e.g. a mounted tablet, display system, smart glasses, hologram device). The wearable device 120 can include a display component 122, for example a display that can present information through visual, auditory, and/or other tactile cues (e.g., a display, a screen, a lamp, a light-emitting diode (LED), a graphical user interface (GUI), and the like). The display component may, for example, present an augmented reality (AR) view to a user, that is a live direct or indirect view of the physical real world environment supplemented by computer generated sensory input. In some embodiments, the wearable device 120 may have an imaging or optical input component 124. The network 110 may be further connected, via the network, to one or more local or remote servers 160 or computing systems 162.

Figure 2:
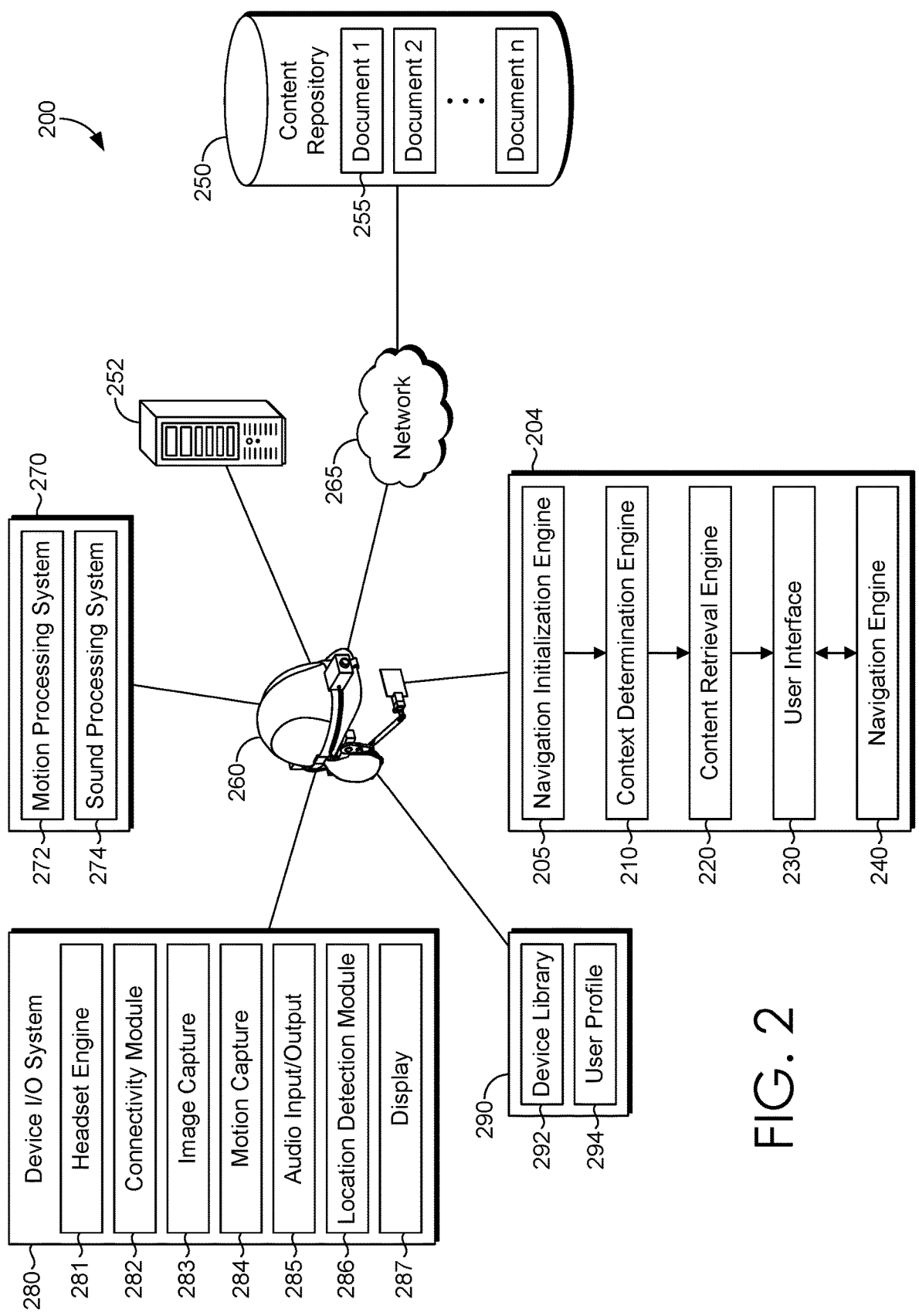

FIG. 2 depicts aspects of a content navigation system 200 used in conjunction with a wearable device (e.g. 120 of FIG. 1) in accordance with various embodiments of the present disclosure. The content navigation system 200 can include a plurality of engines or modules that make up a content navigation stack 204, including but not limited to: a navigation initialization engine 205, a context determination engine 210, a content retrieval engine 220, a navigation engine 240, and a user interface 230. As depicted, the content navigation system 200 comprises a content repository 250, which can also be a plurality of content repositories that are in operable communication with any of the engines or modules. A content repository can be a local or remote storage device or database configured to contain or host a plurality of content 255, for example document files or video files or both. It will be appreciated that in some embodiments, content may also comprise a digital feed or streaming content. The content navigation system 200 can obtain input from a user (e.g., via a user interface) or, alternatively, be obtained from another external system or engine via an interface (e.g. user device 108 of FIG. 1).

The initialization engine 205 is generally responsible for facilitating communication between the user interface, a motion processing system, a sound processing system, storage, device input/output, and their respective subcomponents. The initialization engine 205 may initialize the wearable device 260 in response to receiving a signal from the wearable device I/O system 280. For example, a physical input element (such as a button, switch, or the like) may be depressed signaling that the interaction mode should start running. The device I/O system can have a plurality of modules and engines for receiving and processing input, such as commands. As such the device I/O system can allow the wearable device 260 to interact with the system. The device I/O system modules and engines can include, but is not limited to, a headset engine 281, a connectivity module 282, an image capture module 283, a motion capture module 284, an audio input/output module, a location detection module 286, and a display 287. In operable communication with the device I/O system can be one or more processing systems 270, including but not limited to a motion processing system 272 and a sound processing system 274, which can process motion and sound received in any way by the wearable device 260. As part of the initialization sequence, one or more pieces of content 255 (e.g. document files, video files) from the content repository may be loaded onto the wearable device and stored in the device library 292. Content may be loaded onto the wearable device 260 via any known data push or pull technology. In some embodiments, content is loaded onto the device based on some user data associated with a user profile 294. The device library 292 and the user profile 294 can be part of a local device storage 290. Further, in other embodiments, content loaded onto the wearable device 260 (e.g. onto the local device storage 290) can be subsequently associated with a user profile 294. In this way, for example, if the same user initializes the device, previously loaded or used content associated with the particular wearable device and/or user profile will be reloaded or reinitialized along with the wearable device 260. It will be appreciated that as long as the wearable device 260 is connected to a network 265, the wearable device is in operable communication with the content repository 250 and any other local or remote servers or computing systems 252, e.g. while the wearable device is in use a remote operator may push content to the wearable device 260 for the user. Alternatively, in some embodiments, a user operating the wearable device 260 may connect with any other local or remote servers or computing systems 252 through the headset I/O system 280, e.g. a user of a wearable device 260 may connect with an operator via streaming content.

Once the wearable device 260 is initialized, a context determination engine 210 can determine a context for the device and/or user or both. The context for the device can be based on any number of contextual identifiers, including location information and orientation information (i.e. direction in three-dimensional space r, θ, φ).

Context, in reference to the wearable device and/or user can be determined by any number of location indicators including, but not limited to: bar codes, quick response (QR) codes, Bluetooth beacons, visual machine recognition, visual object recognition, global positioning system (GPS), radio frequency identification (RFID), near field communication (NFC), WiFi, or any other known radio-based identifiers, visually-based identifiers, or inertially based identifiers, such as accelerometers or gyroscopes incorporated into a device. A location indicator (i.e. 140 of FIG. 1 as a sensor/transmitter) utilizing any one of the above technologies can in some embodiments pair with the wearable device 260 and via the context determination engine 210, determine a context for the wearable device 260 and/or user in any given instance of an initialized session. It will be appreciated that an internal sensor on the wearable device may directly come into operable communication with any of the location indicators above, or alternatively a user may have another device or scanner to scan the bar code or QR code, recognize the beacon, sense the RFID tag etc. (i.e. 150 of FIG. 1) which may activate the location indicator and the wearable device (e.g. by the location detection module 286 of FIG. 2) and connect them. In some embodiments in accordance with the present disclosure, context can also be based on a user role (e.g. derived from user profile 294) or a time (e.g. time of day).

A content retrieval engine 220 can retrieve relevant content for display to a user based on the determined context (e.g. via a display 122 of FIG. 1). In various embodiments, content in the content repository 250 and the device library 292 can be associated with one or more digital tags which can be embedded as metadata within the document; in other words context is encoded into a digital tag and associated with one or more pieces of content or one or more portions of a piece of content. Each digital tag can also be associated with one or more contexts that may be determined by the context determination engine 210 for the wearable device 260. Thus, a digital tag can be associated with a piece of content and one or more contexts. In operation, after the wearable device 260 is initialized and loaded with one or more tagged pieces of content, the content retrieval engine 220 can present one or more pieces of relevant or suggested content based on the determined context via a user interface 230. In this way the content retrieval engine 220 can filter the content initially loaded onto the device. In some embodiments, if the wearable device 260 is connected to the network 265 content stored in the content repository 250 may be accessed.

Once the context based content is presented to a user, a navigation engine 240 can receive a command (e.g. a voice command) from a user to perform an action corresponding to a particular digital tag presented and available to a user on the display of the wearable device 260. For example, in one aspect a particular digital tag may allow a user to open a document associated with it. In another embodiment, a particular digital tag may allow a user to navigate to a specific page within a document, to a specific zoom level on a page within a document, to a specific XY coordinate on a page within a document, or a combination of any of the foregoing. As such, a document may have at least a second digital tag associated with it to drive the navigation through the document. It is to be understood that a given piece of content (or document in this example) may have any number of digital tags associated with it. Commands received by the wearable device 260 enable a user to navigate into and out of a specific document, as well as to any particular area within the document via the navigation engine 240. Based on the received commands, a user is presented with any portion of content via the user interface 230 without having to navigate through one or more file trees, for example. In operation the user interface 230 and the navigation engine 240 can work in tandem to navigate through the content and present the desired content to a user, by receiving commands selecting a digital tag and presenting the content or portions of content associated with that digital tag.

Figure 3:
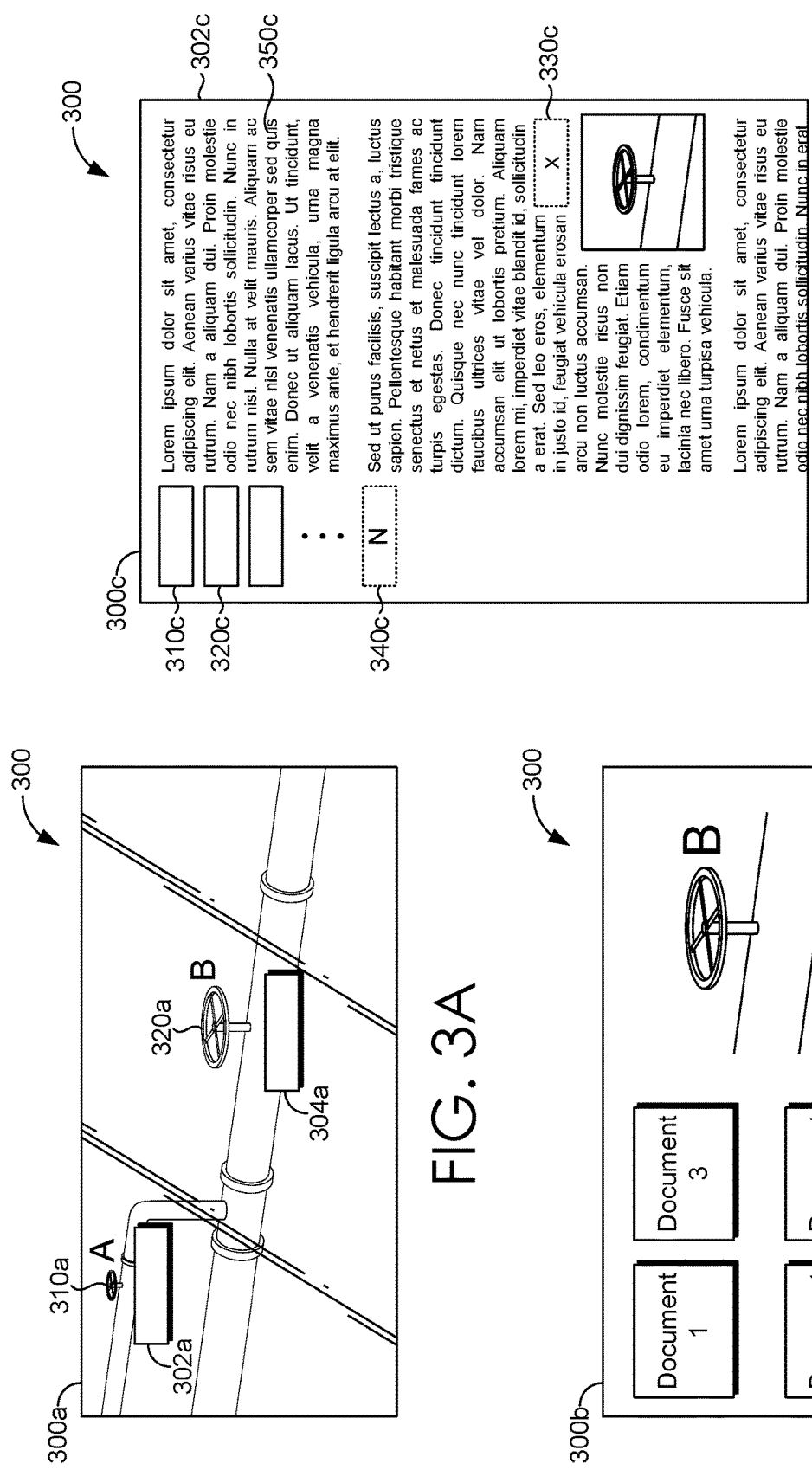

Looking now to FIG. 3A, a screen display showing an example user interface 300a showing a presentation radar to a user for content navigation is depicted. The context determination engine (e.g. 210 of FIG. 2) can determine that multiple contexts exist within the view (e.g. display 122 of FIG. 1) of a wearable device, in this case a first context 310a and a second context 320a is presented. A first dashboard indicator 302a and a second dashboard indicator 304a are presented to a user via the user interface (e.g. 230 of FIG. 2) indicating that content is available for each of physical units A and B being viewed through the display as well as available for selection by a user. A command can be received from the user to enter the content collection for either physical unit.

Looking now to FIG. 3B, as screen display showing an exemplary user interface 300b providing an indication that at least one document 310b, 320b is associated with physical unit B based on the determined context is depicted. At least one document 310b, 320b can be thus available for selection by a user via a received command. Although voice commands are pointed out, it is contemplated that each document (or other content) can be selected with any method known to indicate a selection. Further, although a plurality of documents are shown in the figure, it will be appreciated that the tile indicators 310b and 320b can represent any number of content (e.g. video, streaming) or applications that can be run on the wearable device. In the AR user interface context the representations or indicators on the user interface can be deep links to applications or other content, and in the display a user sees metadata representing content or packaged content that can be accessed locally or in a distributed system. In some embodiments the tiles (e.g. 310b, 320b) may represent applications that can be activated by a user through a command (e.g. voice command) that utilizes the determined context. In this way, context as used herein can be shared across content and applications that can be presented and utilized by a user of the wearable device.

Looking now to FIG. 3C a screen display showing an exemplary user interface 300c that displays a portion of content 302c is depicted. Based on a command selection in interface 300b received by the wearable device, a user can navigate to a first portion 350c of content. In some embodiments, one or more digital tags 310c, 320c associated with document 302c may be presented to the user as well via the display, and upon receiving a command from a user, the content navigation system enables a user to navigate to any portion of content associated with a digital tag. In some alternate embodiments, the digital tags are embedded in the document are not visible to a user. In this instance, a user may use voice commands to move from a first portion's associated digital tag to a second portion's associated digital tag in some logical or predetermined order. Further, it will be appreciated that a user may also manually navigate through any content without the use of digital tags, e.g. navigate to the next page of a document where there is no associated digital tag. It is to be appreciated that received commands may also allow a user to navigate into and out of screen displays 300a-300c.

Continuing with screen display 300c, at any point of interaction with the system and a piece of content, a user may add one or more digital tags 340c or one or more annotations 330c to the piece of content. Annotations can be, for example, written notations, sound bytes, video bytes, or any other type of annotation that can be added to the document or content. In some embodiments, an annotation can itself be associated with a digital tag, and similarly presented to a user, for example along with digital tags 310c, 320c. Upon addition, the added digital tags or added annotations may be associated with the piece of content, associated with the wearable device, associated with the user profile, or any combination of the foregoing and stored in the local device memory. In some embodiments, annotations and digital tags can be displayed simultaneously on the content; and in some instances annotations may only be visible in certain views of a piece of contents, i.e. certain pages, certain zoom levels, certain XY coordinates on a page. In other embodiments, annotations may be shown and hidden via commands received on the wearable device from a user. When the wearable device is reconnected to a network those additions and associations can synchronize to a server or other external computing system (e.g. 252 of FIG. 2) and/or to a content repository (e.g. 250 of FIG. 2). In this way, digital tags and/or annotations can be shareable across authenticated users, devices, and organizations. Further, digital tags associated with different contexts and different pieces of content may be built up over time.

In some embodiments, a wearable device may record that an identified user viewed and/or accessed a piece of content or a specific portion of some content, the user may have viewed and/or accessed the content or portion of content via one or more digital tags or may have navigated there without the use of a digital tag. The wearable device may store the accessing and/or viewing as metadata on the device associated with the content, the user profile, the context the wearable device is in or any of the foregoing. The viewing and/or accessing may further be stored in association with the content in the content repository or on one or more servers or external computing systems. The content navigation system can thus track which pieces of content or portions of content have been accessed and/or viewed over time and monitor the history of users and devices, the contexts they have determined, and what content has been access when in that determined context. As such, it is possible that the content navigation system can suggest to a user one or more digital tags based on a determined context that other users have accessed. In some embodiments, a threshold can be set by a systems administrator such that the suggestions of digital tags in a particular context to subsequent users do not occur until the set threshold is met, different thresholds may be set for different contexts (e.g. locations) or for different user roles (e.g. tracking is only recorded by the system for some but not all user roles). In some embodiments, where a specific portion of content that does not have an associated digital tag is accessed and/or viewed enough times to meet the threshold for a given context, a content navigation system may automatically add a digital tag to that portion of content and associate the digital tag with that given context. The content navigation system may utilize thresholds and automated digital tagging at any level of granularity for a piece of content; i.e. the content navigation may consider the document, the specific page, the specific zoom level, the specific coordinates on the page or any combination of the forgoing.

Figure 4:
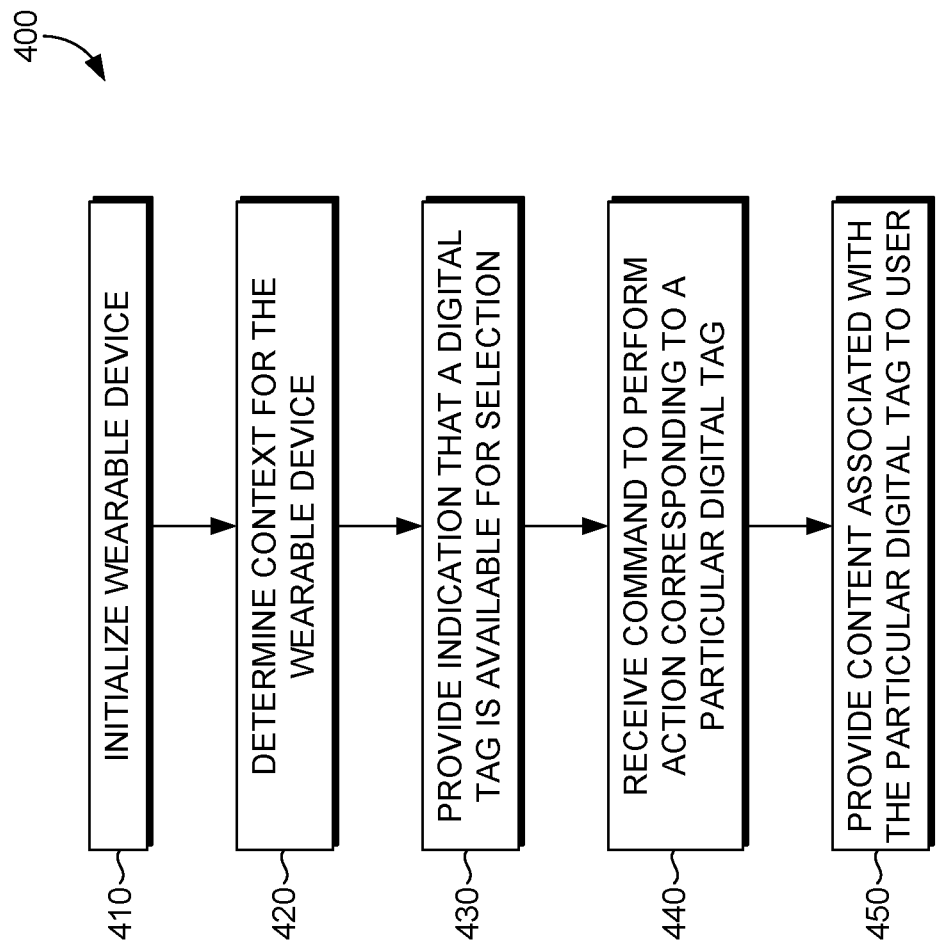

Having described various aspects of the present disclosure, exemplary methods are described below for navigating content based on context using a wearable device. Referring to FIG. 4 in light of FIGS. 1-3c, FIG. 4 is a flow diagram showing a method 400 for enabling content navigation. Each block of method 400 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 410, a wearable device can be initiated, for instance, by an I/O system of a content navigation system (e.g., content navigation system 200 of FIG. 2). Once initialized, one or more pieces of content (e.g. document file, video file) can be loaded into the local memory of the wearable device. Each piece of content includes one or more associated digital tags.

At block 420 a context can be determined for the wearable device. In one aspect the context may be determined through the use of a location indicator (e.g. a Bluetooth beacon), an orientation indicator (e.g. a gyroscope), or a combination of the foregoing.

At block 430, one or more indications that content is available for selection is provided to a user via a display on the wearable device. The indications represent content stored in the wearable device library associated with the determined context by at least one digital tag.

At block 440, a command is received by the content navigation system to perform an action corresponding to a particular indicator, for example, selecting a particular piece of content. At block 450, content is provided to a user via a display.

Figure 5:
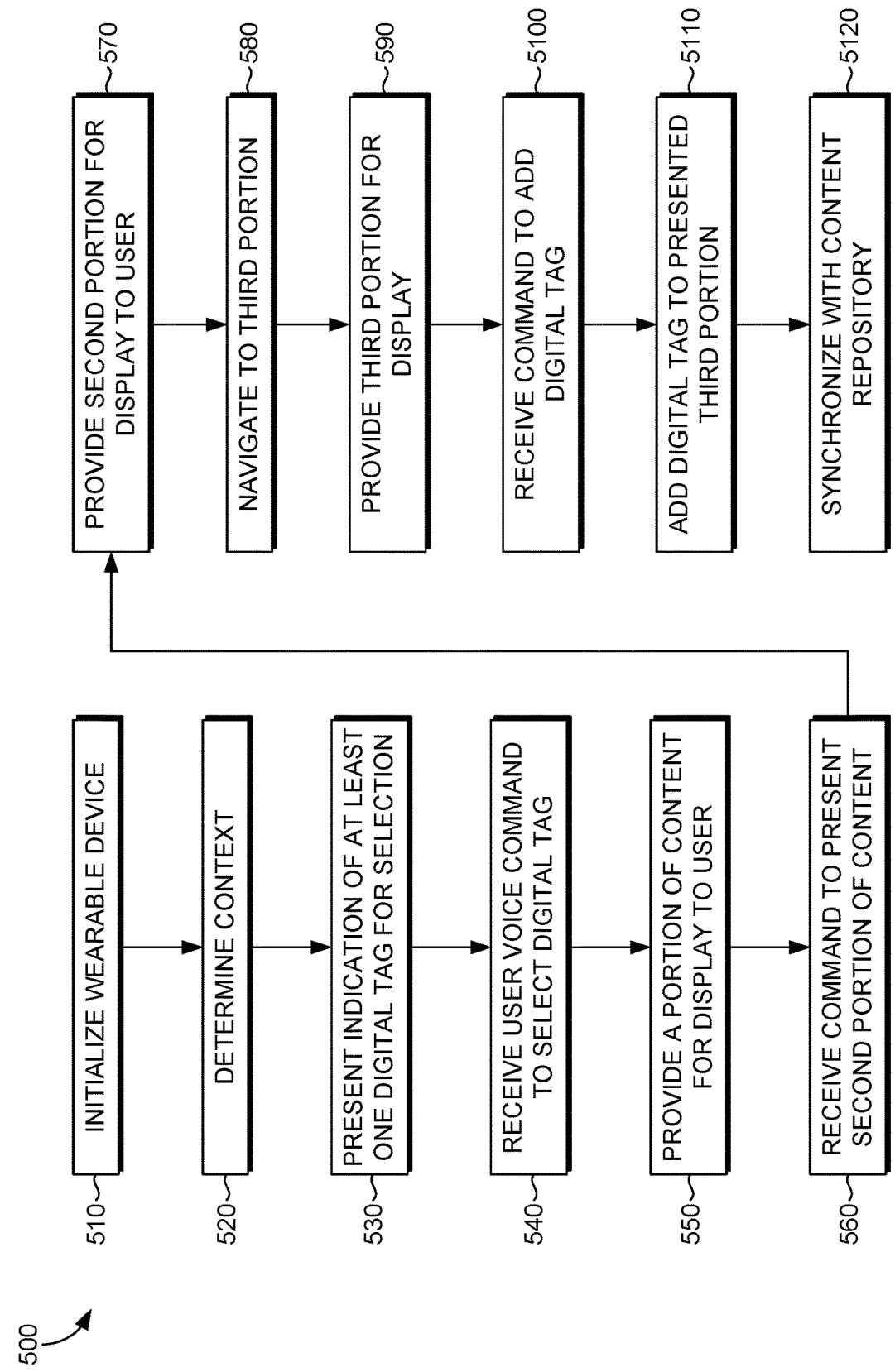

Referring to FIG. 5 in light of FIGS. 1-3c, FIG. 5 is a flow diagram showing a method 500 for enabling content navigation. At block 510, a head-mounted computing device is initialized. Upon initialization, a user of the head-mounted computing device or an administrator and/or automated server at a remote location can load one or more digital content files into the memory of the head-mounted computing, creating a library of available content for the head-mounted computing device to utilize. Each of the one or more digital content files comprise at least one digital tag, including at least one digital tag associated with a geocoded context.

At block 520, a context is determined for the head-mounted computing device is determined. The context determined can be based on a location, an orientation, a user-role, a time or any combination of the foregoing. It is to be recognized that the head-mounted computing device can continuously determine a context based on a change in any of the above determination factors. For example, a change in the location or orientation of the head-mounted computing device will cause the content navigation system to re-determine the context of the device. In some embodiments, the context is determined once either simultaneously with or after initialization of the device, and can be changed only after a command or indication is received by the device that context may be re-determined. In some embodiments, more than one contexts may be determined.

At block 530, one or more indications that content is available for selection is provided to a user via a display on the head-mounted computing device. The indications on the display can be one or more representations or indications that an underlying digital tag associated with some content may be selected based on the determined context. In some embodiments the one or more indications represent selectable digital tags themselves. In other embodiments, the indications represent a grouping of selectable digital tags can be available and associated with one or more determined contexts. For example, at specified location and orientation, a user may view within an AR display two physical units that may drive two separate contexts, indications may be provided to the user that each physical unit is associated with at least one digital tag or a grouping of digital tags that the user may select.

At block 540, voice command is received by head-mounted computing device to select a digital tag; alternatively, the head-mounted computing device can receive a command to perform an action corresponding to the digital tag. In some embodiments, a user may select any digital tag that is presented via the display, in other embodiments, a user may see an indication that there are other digital tags, but may only select one of a sub-set of the displayed digital tags.

At block 550, a first portion of content is provided for display to the user, the first portion of content associated with the selected digital tag. Within the first portion view, other associated digital tags can be presented to a user for further navigation within the content navigation system. In this way, digital tags themselves can be related to each other and connected, when a first digital tag is selected and the content or portion of content associated with the first digital tag is presented, along with the presentation of the content or portion of content can be one or more indications that other selectable digital tags are available. In some embodiments the selection of one digital tag will drive the presentation of subsequent digital tags and their availability for selection.

At block 560, a voice command to select a second digital tag is received by head-mounted computing device. At block 570, a second portion of content is provided for display to the user, the second portion of content associated with the selected second digital tag. Within the second portion view, other associated digital tags can be presented to a user for further navigation within the content navigation system.

At block 580, a command or set of commands is received by the head-mounted computing device to navigate to a third portion of content. The command or set of commands allow a user of a head-mounted computing device to navigate through digital content freely or in an ad hoc manner. At block 590, the third portion of content is provided for display to a user. If the third portion of content has any associated digital tags, indications of those digital tags may be provided for display to the user as well.

At block 5100, a command or set of commands to add a digital tag to the third portion of content is received. At block 5110 the new digital tag is added to the third portion of content, and associated with both the third portion of content and the determined context. Further, the digital tag can also be associated with a user profile At block 5120, the content with the digital tag is synchronized to the device library. When the head-mounted computing device is connected to a network the content with the added digital tag can be synchronized back to the content repository.

Figure 6:
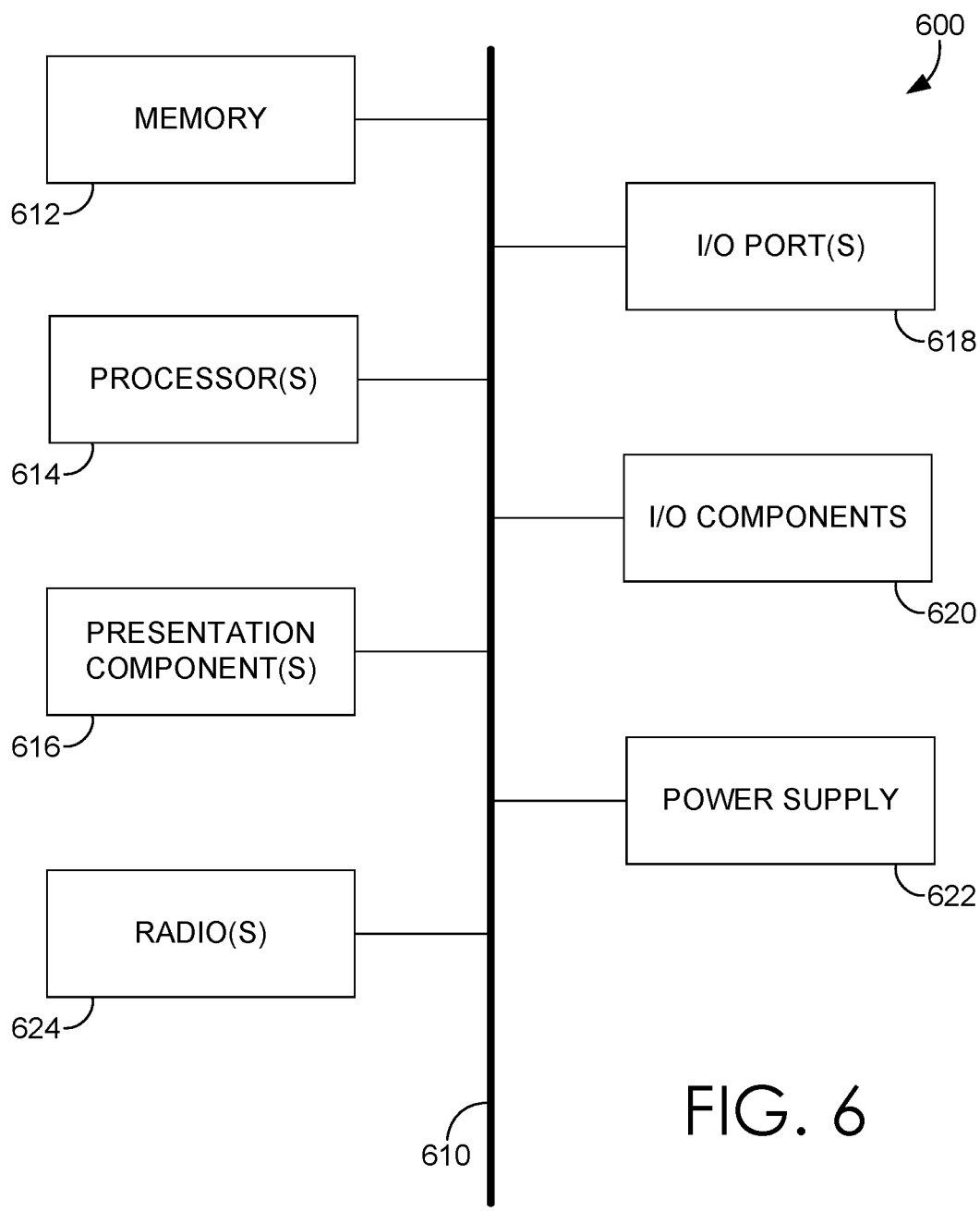

Having described embodiments of the present invention, an example operating environment in which embodiments of the present invention may be implemented is described below in order to provide a general context for various aspects of the present invention. Referring to FIG. 6, an illustrative operating environment for implementing embodiments of the present invention is shown and designated generally as computing device 600. Computing device 600 is merely one example of a suitable computing environment and is not intended to suggest any limitation as to the scope of use or functionality of the invention. Neither should the computing device 600 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output ports 618, input/output components 620, and an illustrative power supply 622. Bus 610 represents what may be one or more busses (such as an address bus, data bus or combination thereof). Although the various blocks of FIG. 6 are shown with clearly delineated lines for the sake of clarity, in reality, such delineations are not so clear and these lines may overlap. For example, one may consider a presentation component such as a display device to be an I/O component as well. Also, processors generally have memory in the form of cache. It is recognized that such is the nature of the art, and reiterate that the diagram of FIG. 6 is merely illustrative of an example computing device that can be used in connection with one or more embodiments of the present disclosure. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600, and includes both volatile and non-volatile media, removable and non-removable media. By way of example, and not limitation, computer-readable media may comprise computer storage media and communication media.

Computer storage media include volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner at to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or non-volatile memory. As depicted, memory 612 includes instructions 624, when executed by processor(s) 614 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 600 includes one or more processors that read data from various entities such as memory 612 or I/O components 620. Presentation component(s) 616 present data indications to a user or other device. Illustrative presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Many variations can be made to the illustrated embodiment of the present invention without departing from the scope of the present invention. Such modifications are within the scope of the present invention. Embodiments presented herein have been described in relation to particular embodiments which are intended in all respects to be illustrative rather than restrictive. Alternative embodiments and modifications would be readily apparent to one of ordinary skill in the art, but would not depart from the scope of the present invention.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the invention.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B, and C" means "(A), (B), (C), (A and B), (A and C), (B and C), or (A, B, and C)."

What is claimed is:

1. A computer-implemented method for electronic document navigation on a head-mounted computing device, comprising:
    determining, by the head-mounted computing device, a context for the head-mounted computing device based at least in part on one or more location indicators detected by a set of location sensors coupled to the head-mounted computing device;
    based on a searched history of a plurality of determined contexts including the context, identifying, by the head-mounted computing device, an electronic document accessed while the context was previously determined, a portion of the electronic document accessed while the context was previously determined, and a number of times the portion of the electronic document was accessed while the context was previously determined, wherein the portion of the electronic document is a section on a page of a plurality of pages in the electronic document;
    associating, by the head-mounted computing device, a digital tag with the portion of the electronic document based on the searched history, a determination that the portion of the electronic document is not associated with any digital tag, and a determination that the number of times the portion of the electronic document was accessed while the context was previously determined exceeds a threshold;

retrieving, by the head-mounted computing device, the electronic document based on a selection of the digital tag;

responsive to the electronic document being retrieved, providing for display, by the head-mounted computing device, the portion of the retrieved electronic document based on the selected digital tag, wherein the portion of the retrieved electronic document is a zoomed portion of the retrieved electronic document being zoomed based on a zoom level defined by the digital tag;

adding, by the head-mounted computing device, an annotation associated with the digital tag to the portion of the retrieved electronic document based on a further received command, wherein the added annotation is employable to automatically navigate to one of a different portion or a different electronic document from the portion when the portion is displayed.

2. The method of claim 1, wherein the digital tag defines a set of coordinates that correspond to the portion of the electronic document, the displayed portion corresponding to the defined set of coordinates.

3. The method of claim 1, wherein the electronic document is retrieved based further on a determination that the digital tag further corresponds to a user role associated with the head-mounted computing device.

4. The method of claim 1, further comprising:
receiving, by the head-mounted computing device, a voice command that corresponds to a different digital tag associated with the retrieved electronic document; and
providing for display, by the head-mounted computing device, a different portion of the electronic document, defined by the different digital tag, based on a determination that the different digital tag associated with the retrieved electronic document corresponds to the received voice command.

5. The method of claim 1, wherein a location indicator includes one of a bar code, a quick response (QR) code, a Bluetooth beacon signal, a RFID tag, a GPS signal, a NFC signal, a Wi-Fi signal, or a recognized object.

6. The method of claim 1, further comprising:
based on the determined context, navigating, by the head-mounted computing device, to one of a different portion of the retrieved electronic document or a different electronic document in response to a set of inputs received while the portion is displayed, wherein a different digital tag associated with the determined context and corresponding to one of the different portion or the different electronic document is generated based at least in part on the navigation.

7. The method of claim 6, wherein the electronic document is retrieved from a remote server device configured to generate the different digital tag.

8. The method of claim 7, wherein the remote server device is configured to synchronize the electronic document and at least the digital tag and the different digital tag with the head-mounted computing device.

9. The method of claim 6, further comprising: providing for display, by the head-mounted computing device, one of the generated different digital tag or the associated annotation with the portion of the electronic document based on a subsequent display of the portion.

10. At least one computer storage media, having instructions thereon that, when executed by at least one processor, cause the at least one processor to:

initialize a head-mounted computing device, wherein the head-mounted computing device is in operable communication with a content storage system;

determine, by the head-mounted computing device, a context for the head-mounted computing device based at least in part on one or more location indicators detected by a set of location sensors coupled to the head-mounted computing device;

based on a searched history of a plurality of determined contexts including the context, identify, by the head-mounted computing device, an electronic document accessed while the context was previously determined, a portion of the electronic document accessed while the context was previously determined, and a number of times the portion was accessed while the context was previously determined, wherein the portion of the electronic document is a section on a page of a plurality of pages in the electronic document;

associate, by the head-mounted computing device, a digital tag with the portion of the electronic document based on the searched history, a determination that the portion of the electronic document is not associated with any digital tag, and a determination that the number of times the portion was accessed while the context was previously determined exceeds a threshold;

retrieve, by the head-mounted computing device, the electronic document from the content storage system based on a selection of the digital tag;

responsive to the electronic document being retrieved, provide for display, by the head-mounted computing device, to a display of the head-mounted computing device, the portion of the retrieved electronic document based on the selected digital tag, wherein the portion of the retrieved electronic document is a zoomed portion of the retrieved electronic document being zoomed based on a zoom level defined by the digital tag; and add, by the head-mounted computing device, an annotation associated with the digital tag to the portion of the retrieved electronic document based on a further received command, wherein the added annotation is employable to automatically navigate to one of a different portion or a different electronic document from the portion when the portion is displayed.

11. The computer storage media of claim 10, wherein the digital tag defines a set of XY coordinates on the page of the electronic document corresponding to the portion.

12. The computer storage media of claim 10, wherein the context is determined based further on a user role associated with the head-mounted computing device.

13. The computer storage media of claim 10, wherein the context includes a physical location of the head-mounted computing device.

14. The computer storage media of claim 12, wherein the digital tag further defines the user role.

15. The computer storage media of claim 10, wherein the instructions further cause the at least one processor to: provide for display, to the display of the head-mounted computing device, the generated digital tag, wherein the digital tag is selected based on a received voice command determined to correspond to the displayed digital tag.

16. A head-mounted computing device comprising:

at least one processor; and at least one computer storage media storing computer-useable instructions that, when executed by the at least one processor, causes the at least one processor to:

determine, by the head-mounted computing device, a context for the head-mounted computing device based at least in part on one or more location indicators detected by a set of location sensors coupled to the head-mounted computing device;

based on a searched history of a plurality of determined contexts including the context, identify, by the head-mounted computing device, an electronic document accessed while the context was previously determined, a portion of the electronic document accessed while the context was previously determined, and a number of times the portion was accessed while the context was previously determined, wherein the portion of the electronic document is a section on a page of a plurality of pages in the electronic document;

associate, by the head-mounted computing device, a digital tag with the portion of the electronic document based on the searched history, a determination that the portion of the electronic document is not associated with any digital tag, and a determination that the number of times the portion was accessed while the context was previously determined exceeds a threshold;

retrieve, by the head-mounted computing device, the electronic document from a remote content storage system based on a selection of the digital tag;

responsive to the electronic document being retrieved, provide for display, by the head-mounted computing device, on a display of the head-mounted computing device, the portion of the retrieved electronic document based on the selected digital tag, wherein the portion of the retrieved electronic document is a zoomed portion of the retrieved electronic document, the portion being zoomed based on a zoom level defined by the digital tag; and adding, by the head-mounted computing device, an annotation associated with the digital tag to the portion of the retrieved electronic document based on a further received command, wherein the added annotation is employable to automatically navigate to one of a different portion or a different electronic document from the portion when the portion is displayed.

* * * * *